US006707894B1

(12) United States Patent
Halford

(10) Patent No.: US 6,707,894 B1
(45) Date of Patent: Mar. 16, 2004

(54) PREPAID CALLING TIME PROCESSING: A METHOD AND APPARATUS FOR PROCESSING PRE-PAID CALLING TIME IN A TELEPHONE COMMUNICATION SYSTEM

(75) Inventor: Keith Halford, Madison, MS (US)

(73) Assignee: AT&T Wireless, Redmond, WA (US)

( * ) Notice: Subject to any disclaimer, the term of this patent is extended or adjusted under 35 U.S.C. 154(b) by 0 days.

(21) Appl. No.: 09/578,031

(22) Filed: May 24, 2000

(51) Int. Cl.$^7$ .............................................. H04M 15/00
(52) U.S. Cl. ............................... 379/114.2; 379/114.16; 379/14.17
(58) Field of Search ............................ 379/111, 112.01, 379/114.01, 114.03, 114.15, 114.16–114.17, 114.19–114.2, 115.01, 115.02, 120, 124, 126, 127, 144.01

(56) References Cited

U.S. PATENT DOCUMENTS 5,995,822 A * 11/1999 Smith et al.
6,137,872 A * 10/2000 Davitt et al.
6,285,749 B1 * 9/2001 Manto

FOREIGN PATENT DOCUMENTS

WO    WO 00/11568    * 3/2000

* cited by examiner

*Primary Examiner*—Duc Nguyen
(74) *Attorney, Agent, or Firm*—Fulbright & Jaworski, L.L.P.

(57) ABSTRACT

Methods and systems are provide for processing prepaid calling time to a subscriber by determining an identity of a subscriber of prepaid calling time upon origination of a call to which a subscriber of prepaid calling time is to be a party; determining an amount of prepaid calling time available to the subscriber; allowing a call to which the subscriber is to be a party to be connected if prepaid calling time is available to the subscriber; and deducting calling time from the available prepaid calling time of the subscriber as the connected call proceeds. The method also provides for purchasing pre-paid calling time by electronically transferring funds from an account of the subscriber to an account of a pre-paid call time provider, the amount of funds transferred equal to the dollar amount of pre-paid calling time to be credited to the subscriber; and crediting to the subscriber an amount of pre-paid calling time corresponding to the dollar amount of the transferred funds.

7 Claims, 3 Drawing Sheets

PREPAID CALLING TIME PROCESSING: A METHOD AND APPARATUS FOR PROCESSING PRE-PAID CALLING TIME IN A TELEPHONE COMMUNICATION SYSTEM

FIELD OF THE INVENTION

This invention relates to processing of prepaid calling time in a telephone communication system.

BACKGROUND OF THE INVENTION

Telephone communication service providers have substantially increased the number of services they offer in recent years. This has been made possible by the development of technology related to digital signal processing, and large-scale circuit integration, as well as the deregulation of the telecommunications industry and the implementation of a mobile telephony infrastructure. There is a large demand for these services. For example, one service that many consumers desire is the option to purchase prepaid calling time. Consumers who do not have a credit card against which they can charge the cost of a toll telephone call often desire to purchase prepaid calling cards. Prepaid calling cards provide the consumer with a fixed amount of calling time in exchange for the price paid when the card is purchased. Often, a prepaid calling card will provide a lower effective long distance rate than can otherwise be obtained.

However, conventional pre-paid calling services have several disadvantages. A consumer using a prepaid calling card must first call a telephone number of the prepaid service provider. Once this connection is established, the consumer must then dial a Personal Identification Number (PIN). Then, the consumer must dial the telephone number of the call destination. Thus, two long distance calls must be typically be made to establish the connection. Further, the consumer must typically dial more than twenty digits to complete the call. Also, the prepaid service is often unavailable for local toll calls. Moreover, when the prepaid time expires, the consumer must go to a store and purchase another prepaid calling card. Thus, existing methods for providing prepaid calling time to consumers is inconvenient.

Many consumers of prepaid calling services lack the credit-worthiness to obtain toll telephone services on a post-pay basis. Therefore, these consumers find it difficult to obtain mobile phone services, which are normally offered on a post-pay basis for credit-worthy consumers. Although some companies do provide mobile phone services on a prepaid basis, such prepaid services also present disadvantages. For example, the consumers of prepaid mobile phone calling time must typically pay higher calling rates. Also, when the prepaid time expires the consumer must return to the service provider to prepay for additional calling time. Moreover, the consumer will be uncertain of the prepaid call time remaining and risks being unable to make a call or complete a call in progress due to the expiration of prepaid time.

Therefore, there is a need for systems and methods for providing prepaid calling services that overcome these and other disadvantages of the prior art.

SUMMARY OF THE INVENTION

An object of the present invention is therefore to provide systems and methods for providing prepaid calling services that overcome disadvantages of existing prepaid calling services.

According to the present invention, a consumer of prepaid calling time is assigned an account. The consumer prepays an initial amount of money into the account. The monetary balance of the account is equated to an amount of prepaid calling time available to the consumer. When a consumer makes a telephone call, the time of the call is subtracted from the consumer's prepaid calling time as the call proceeds. The account is also debited by a dollar amount corresponding to the calling time consumed as the call proceeds.

The process of monitoring the time of the call and debiting the account may be performed at a site that is local to the consumer. In particular, the process can be performed at the Local Switching Office (LSO) or Mobile Switching Center (MSC). When a consumer makes a call, the switching center identifies the origin of the call and determines if the call originates from a prepay subscriber. If so, the account of the subscriber is identified. The account is evaluated to determine the amount of prepaid calling time remaining to the subscriber. This amount of time may be communicated to the subscriber by voice such that only the subscriber hears it. Alternatively, the amount of time remaining to the subscriber may be displayed on a display of the phone of the subscriber. If the prepay subscriber has prepaid calling time remaining the call is connected to its destination and the call progresses. The time of the call is subtracted from the prepaid calling time as the call proceeds. Also, the balance of the subscriber's account may be decremented as the call proceeds. If the amount of calling time remaining becomes less than a certain pre-designated time, for example, two minutes, the subscriber may be informed of this during the call by a voice message that is unheard by anyone other than the subscriber. If the prepaid time available to the subscriber is exhausted the connection may be terminated.

In the usual case, a landline telephone subscriber, such as a residential subscriber is only charged for a toll call that he or she initiates. In contrast, a mobile phone subscriber is charged for calling time even though the subscriber does not originate the call. Thus, when a call destined for a mobile subscriber is received at the local switching office, according to the present invention a determination is made whether the destination of the call is a prepaid mobile subscriber. If so, the subscriber's account is evaluated to determine the amount of prepaid call time available to the subscriber, if any. That amount of time may be communicated to the subscriber without the knowledge of any other party to the call. Once the connection is established, the time of the call is subtracted from the remaining prepaid time available to the subscriber as the call proceeds. Also, the balance of the subscriber's account may be decremented as the call proceeds. When the prepaid time remaining to the subscriber falls below a certain threshold, the remaining prepaid time may be communicated to the subscriber without the knowledge of other parties to the call. If the prepaid time remaining to the subscriber is exhausted, the connection may be terminated.

The present invention also provides for the convenient purchase by the consumer of additional prepaid calling time by way of electronic funds transfer. According to the present invention the consumer may use an Automatic Teller Machine (ATM) to transfer funds from a bank account of the consumer to a prepay account of the consumer. The amount transferred to the prepaid calling account is added to the current balance of the prepaid calling account and is automatically translated into an additional amount of prepaid call time available to the consumer. The present invention also provides for purchase of additional calling time by way of telephone-controlled transfer of funds from the consumer's bank account to the call time account of the consumer. Thus, according to the present invention, the subscriber may receive notice of the remaining prepaid time to determine if sufficient time remains for the subscriber to complete a telephone conversation. In response the subscriber may enter a code using the keys of the subscriber's telephone handset. This code will be received and interpreted as an authorization by the subscriber to electronically transfer an amount of funds from the subscriber's bank account to the subscriber's call time account. This transfer can be completed in less than a few seconds. When completed, the subscriber will thereupon have the additional available prepaid time that corresponds to the dollar amount of the transfer.

These and other aspects and features of the invention will be further understood by reference to the following drawings and descriptions of exemplary embodiments of the invention.

DESCRIPTION OF PREFERRED EMBODIMENTS

Figure 1:
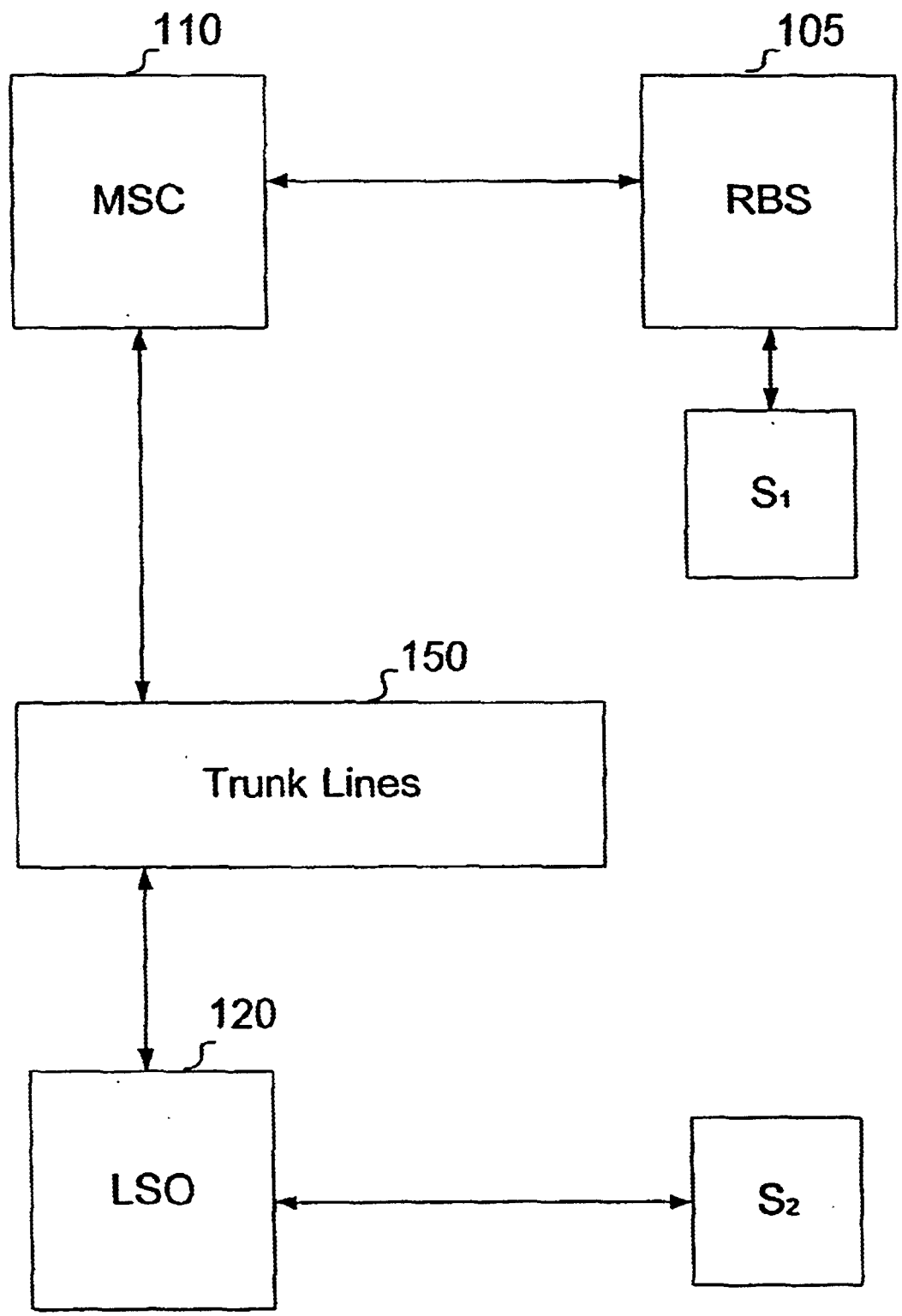
FIG. 1 is an illustration of a telephone communication system configuration.

FIG. 1 illustrates a typical configuration of a telephone communication system for serving a plurality of subscribers in various locations. Each of a plurality of subscribers is connected to a Local Switching Office (LSO) or Mobile Switching Center (MSC) as shown. Each switching center, whether an MSC or LSO, is connected to one or more other switching centers by way of telephone trunk lines. For example, mobile or fixed subscribers, such as $S_1$, are connected by a radio frequency (RF) link to a radio base station 105, which is connected to a Mobile Switching Center (MSC) 110. MSC 110 is connected to other switching centers by way of telephone trunk lines 150. Other subscribers (not shown) may also be in communication with MSC 110 by way of radio base station 105 or other radio base stations (not shown) that are connected to MSC 110. Other Mobile Switching Centers (not shown) may also be connected to trunk lines 150. Subscribers, such as $S_2$, are connected by landlines to Local Switching Office (LSO) 120. The landlines connecting fixed subscribers to LSO 120 are typically metal wire lines or optical fibers. Local Switching Offices, such as LSO 120, are connected to trunk lines 150. Trunk lines 150 are typically metal wire lines and provide an electrical path for voice and signaling between the switching centers. Thus, the system of FIG. 1 provides the signaling and connectivity required for any subscriber to communicate with any one or more subscribers at distant locations. The configuration shown in FIG. 1 is only representative; persons of ordinary skill in the art will recognize that other configurations are possible and do in fact exist.

A telephone service provider may control, (by ownership, lease, or other legal arrangement) one or more sites and charge for calls, whether prepaid or not, that must pass through the sites it controls to form a connection between an originating subscriber and a destination subscriber. Such sites may be switching centers as MSC 110 or LSO 120 or other comparable sites. These sites will typically contain firmware for performing processing functions common to all calls, such as determination of subscribed services, determination of call origin and destination, etc. Firmware, for performing these functions generally comprises a programmable integrated circuit device such as a microprocessor operating under the directions of software and associated memory. The firmware may be reprogrammed to upgrade the functions performed at the site as well as to add new call processing functions. Preferably, the methods of the present invention are implemented by reprogramming the existing firmware to perform the functions described herein. Alternatively, separate firmware may be installed to implement the methods of the present invention accompanied by an interface to cause the interaction required between the separate firmware and the existing firmware.

Figure 2:
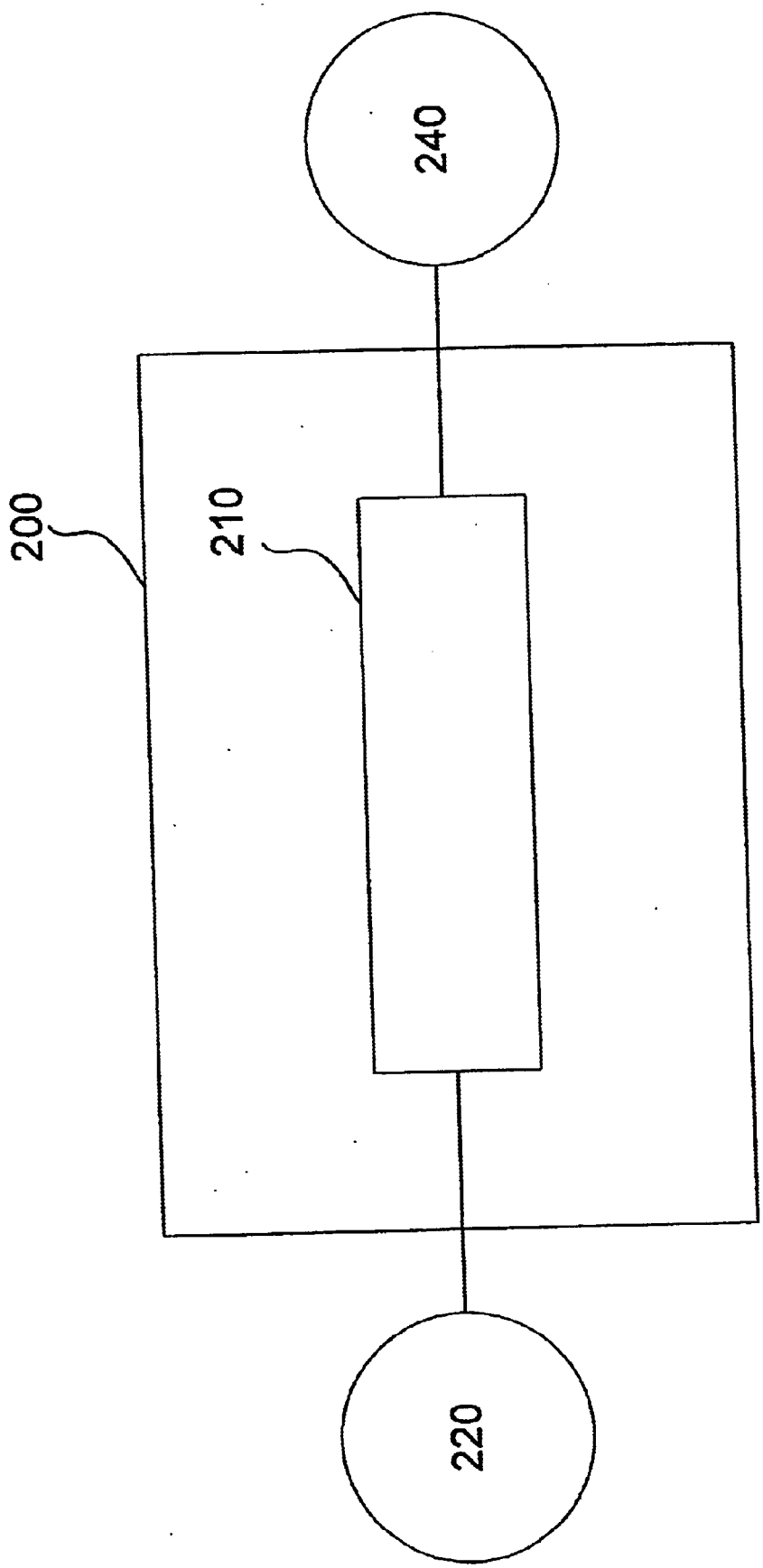
FIG. 2 is a block diagram of a site for call processing.

FIG. 2 shows a block diagram of a site 200 containing a call processor 210. Processor 210 performs processing of prepay call functions for prepaid calls that are connected through site 200 between an originating subscriber 220 and a destination subscriber 240 according to the methods of the present invention. In general, an originating subscriber and destination subscriber may both be subscribed to prepaid call services administered at site 200, or only one of them may be, or neither of them may be. For example, one may be subscribed to prepaid call time services administered at site 200 and the other may be subscribed to prepaid call time services administered at another site. Processor 210 will determine if either or both of the originating subscriber and the destination subscriber have subscribed to prepaid call time services to be administered at site 200.

Suppose that a call is initiated by originating subscriber 220 and is received at site 200. At site 200, call processor 210 determines an originating identification number received from originating subscriber 220. For example, call processor 210 may determine the identity of an originating mobile phone subscriber by determining its Mobile Identification Number (MIN). Call processor 210 also determines a destination identification number corresponding to the destination of the call. Call processor 210 determines whether the call is a toll call or not. A call will be a toll call if the subscribers are in different areas for which a toll is imposed for connections there between. The call will also normally be a toll call to either subscriber that is a mobile subscriber, regardless of whether the mobile subscriber originated the call or is the destination thereof. If the call is a toll call then processor 210 will determine if either subscriber to be tolled is a subscriber to prepaid call time administered at site 200. If the call is not a toll call to either subscriber then no prepay functions will be performed with respect to the call.

If the call is toll, then processor 210 will determine if the subscriber to be tolled is a subscriber of prepaid call time services to be administered at site 200. If the originating subscriber is to be tolled, then processor 210 determines if the originating identification number is one of a subscriber to prepaid call time services to be administered at site 200. If the destination subscriber is to be tolled, then processor 210 determines if the destination identification number is one of a subscriber to prepaid call time services to be administered at site 200. If neither of subscribers 220 or 240 have subscribed to the prepaid calling time services administered by call processor 210, then no prepay functions will be performed with respect to the call. If, however, processor 210 determines that either, or both, subscribers to be tolled is a subscriber of prepaid call time services to be administered at site 200, then processor 210 performs the prepay call time functions for each such subscriber.

Thus, when a party to the call is determined to be a subscriber of prepaid call time services to be administered at site 200, call processor 210 will perform prepay processing functions for the prepay subscriber. Processor 210 determines whether a party is a prepay subscriber by determining if the identification number of the party is an identification number stored in a memory containing the identification numbers of prepay subscribers whose prepay accounts are to be administered by processor 210. If the identification number of a party is determined to be a prepay subscriber then a prepay account number of the subscriber is determined by processor 210. Call processor 210 may be configured such that the account number corresponds to an address of the memory location where the amount of available prepaid calling time is stored. The prepay account number of the prepay subscriber may be the same as the identification number of the subscriber. Alternatively, the identification number of the prepay subscriber may correspond to one or more prepay account numbers assigned to the subscriber. Once the prepay account number is determined then prepay account data, also stored in memory, corresponding to the prepay account number is accessed by processor 210.

Prepay account data comprises the dollar amount in the account. The prepaid calling time is computed as a function of the dollar amount:

$$t_a = f(x)$$

where $t_a$ is the prepaid time available to the prepay subscriber, x is the dollar amount in the prepay account, and $f$ is the prepay allocation function by which the available time is determined from the dollar amount. The allocation function, $f$, is a function determined by the service provider. It may be one of a plurality of functions made available for selection by the prepay subscriber. For example, the function may be determined according to the amount of an initial or interim deposit into a prepay account, such that the larger the initial or interim deposit, the lower will be the toll rate applied to calling time. Thus, the subscriber may determine the rate to be applied according to the initial or interim deposit made by the subscriber.

The amount of prepaid call time remaining to the prepay subscriber is communicated to the prepay subscriber to be tolled. Call processor 210 causes the remaining time to be digitally encoded and embedded in a data stream transmitted to the prepay subscriber. The remaining prepaid time may be conveyed to the prepay subscriber as a voiced message or as a text message caused to appear on a display of the telephone of the subscriber. For example, if the remaining call time is 10 minutes and 37 seconds, the message may be, "You have ten minutes and 37 seconds of prepaid call time remaining." By inserting the message into a data stream transmitted exclusively to the prepay subscriber, the message containing the remaining prepaid time available to the prepay subscriber will be heard or seen by the prepay subscriber but will be unheard and unseen by any other party to the call. A message communicated strictly between site 200 and a prepay subscriber that is not sent to any other party will herein be referred to as a restricted message. Thus, memory is provided for storing message data for embedding into a restricted message transmittable to the subscriber.

If no remaining prepaid calling time remains, the subscriber will be so informed by way of a restricted message, and may also be invited by restricted message to authorize an additional amount to be transferred to a prepay account of the subscriber from a bank account of the subscriber by electronic funds transfer according to the methods of the present invention to be described below. Alternatively, or if the prepay subscriber declines within a fixed period of time, 20 seconds for example, to authorize electronic funds transfer for the purchase of additional prepaid time, the call setup process will be terminated. If prepaid calling time remains, call processor 210 will cause a call connection to be made.

When the connection is completed, that is when destination subscriber 240 goes "off hook," a clock or timer in call processor 210 is initiated. The clock measures an interval of time, $\Delta t$, and subtracts this amount of time from the prepaid time available:

$$t_a = t_a - \Delta t$$

This operation is performed at the end of each time interval, $\Delta t$, so that the remaining prepaid time is decremented as the call proceeds. That is, at the end of each time interval, $t_a$, is replaced in memory by $t_a - \Delta t$. The remaining balance of the prepay account is also decremented at the end of each time interval by a dollar amount corresponding to the interval of calling time consumed:

$$x = x - \Delta x$$

where $\Delta x$ is the incremental dollar amount corresponding to the time interval, $\Delta t$. That is:

$$\Delta x = f^{-1}(\Delta t)$$

where $f^{-1}$ is the inverse of the allocation function, $f$. The process of decrementing the prepaid time and prepay account balance proceeds until the call is terminated. If, during the call, the remaining prepaid time, $t_a$, falls below a pre-determined threshold, $t_m$, then the prepay subscriber is informed by restricted message of the amount of prepaid calling time remaining and can also be warned by restricted message that the call will be disconnected when the remaining prepaid call time expires. When the remaining prepaid call time expires, the call may then be disconnected. The threshold, $t_m$, is set to a practical value, such as 2 minutes, to give the prepay subscriber sufficient time to bring the call to a satisfactory conclusion, or alternatively, to provide the subscriber time to exercise an option to cause a transfer of funds from the subscriber's bank account to the subscriber's prepay account before the expiration of the call.

Figure 3:
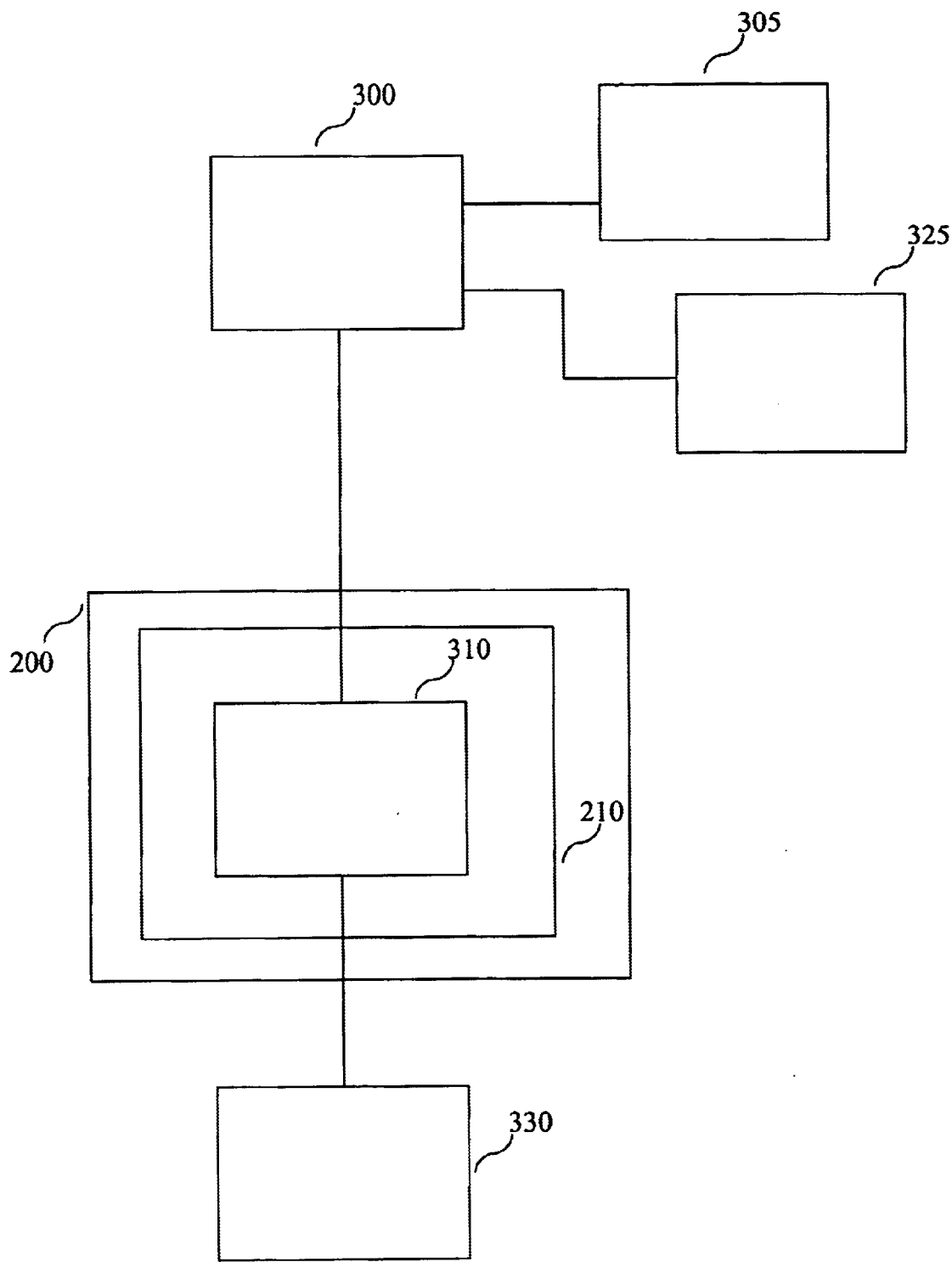
FIG. 3 is a block diagram of a configuration for electronic transfer of funds for purchasing and crediting prepaid calling time.

The present invention also provides for the convenient purchase by the subscriber of additional prepaid calling time by way of electronic funds transfer (ETF). According to the present invention the subscriber may use an Automatic Teller Machine (ATM) to transfer funds from a bank account of the subscriber to a prepay account of the subscriber. The amount transferred to the prepay account is added to the current balance of the prepay account and is automatically translated into an additional amount of prepaid call time available to the consumer. Thus, a service provider of prepaid calling time may enter into an agreement with the bank to provide for the electronic transfer of funds from a bank account of the subscriber to one or more bank accounts of the service provider. FIG. 3 shows a functional diagram of a system for implementing electronic funds transfer for the purchase of prepaid calling time according to the methods of the present invention. When a prepay subscriber desires to purchase prepaid call time, the subscriber selects by way of an ATM 300 the amount of money to be allocated for prepaid call time. For example, ATM 300 may produce a video image that displays a message prompting the subscriber to select an amount to be allocated to prepaid calling administered by the service provider. The subscriber makes the selection by depressing the indicated button on a panel of ATM 300. When the subscriber makes the selection, the selected amount is electronically transferred from the subscriber's account 305 to an account 325 of the service provider. The selected amount and the identity of the subscriber is also electronically transmitted to site 200 and added to a prepay account 310 assigned to the subscriber, thereby making additional prepaid calling time immediately available to the subscriber.

The present invention also provides for purchase of additional calling time by way of telephone-controlled transfer of funds from the subscriber's bank account 305 to the prepay account 310 of the subscriber. Thus, according to the present invention, the prepay subscriber may receive notice, by restricted message, of the remaining prepaid calling time, which allows the subscriber to determine if sufficient time remains for the subscriber to complete a telephone conversation. In response to this restricted message, or at any other convenient time, the subscriber may enter a code using the keys of the subscriber's telephone handset 330. This code will be received as a restricted message by call processor 210 and interpreted as an authorization by the subscriber to electronically transfer an amount of funds from the subscriber's bank account 305 to the service provider's account 325. The amount of the transfer is also added to the subscriber's prepay account 310. This transfer can be completed in less than a few seconds. When completed, the subscriber will thereupon have the additional available prepaid time that corresponds to the dollar amount of the transfer. Using the method of telephone-controlled transfer the subscriber may transmit the dollar amount of the prepaid call time to be purchased or may transmit the amount of time to be purchased. If the amount of time to be purchased is transmitted, then call processor 210 translates this time into a corresponding dollar amount.

Thus, the present invention may be implemented as described above or in other ways that would be apparent to a person of ordinary skill given the disclosure herein. The invention is not limited to the specific embodiments described above, but is defined by the following claims.

I claim:

1. A method for providing and processing prepaid calling time to a subscriber of prepaid calling time, comprising the steps of:

determining whether an originating party is a subscriber of prepaid calling time upon origination of a call;

determining whether a destination party is a subscriber of prepaid calling time upon origination of the call;

determining an amount of prepaid calling time available to each subscriber;

allowing the call to be connected if prepaid calling time is available to each subscriber;

deducting calling time from the available prepaid calling time of each subscriber as the connected call proceeds; and adding prepaid calling time to the available prepaid calling time of one subscriber upon receipt of an amount transferred by an automated teller machine from an account of the one subscriber to a provider of the prepaid calling time.

2. The method of claim 1, further comprising the step of:

sending a restricted message to each subscriber containing the amount of prepaid calling time available.

3. The method of claim 2, wherein the restricted message is sent during the call.

4. A system for administering prepaid calling time services, comprising:

a call processor for:

determining whether an originating party is a subscriber of prepaid calling time upon origination of a call;

determining whether a destination party is a subscriber of prepaid calling time upon origination of the call;

determining an amount of prepaid calling time available to each subscriber;

allowing the call to be connected if prepaid calling time is available to each subscriber;

deducting calling time from the available prepaid calling time of each subscriber as the connected call proceeds; and adding calling time to the available prepaid calling time of one subscriber upon receipt of an amount transferred by an automated teller machine from an account of the one subscriber to a provider of the prepaid calling time; and memory for storing:

a value from which the amount of available prepaid calling time is determined; and a number corresponding to an address of the memory location where the value is stored.

5. The system of claim 4, wherein the memory also stores message data for embedding into a restricted message transmittable to each subscriber.

6. The method of claim 1, wherein either the originating party or the destination party is a mobile phone user.

7. The system of claim 4, wherein either the originating party or the destination party is a mobile phone user.

* * * * *